United States Patent
Cardona et al.

(10) Patent No.: US 10,374,951 B2
(45) Date of Patent: *Aug. 6, 2019

(54) MULTICAST MESSAGE FILTERING IN VIRTUAL ENVIRONMENTS

(71) Applicant: International Business Machines Corporation, Armonk, NY (US)

(72) Inventors: Omar Cardona, Cedar Park, TX (US); James B. Cunningham, Austin, TX (US); Baltazar De Leon, III, Austin, TX (US); Matthew R. Ochs, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 35 days.

This patent is subject to a terminal disclaimer.

(21) Appl. No.: 15/661,836

(22) Filed: Jul. 27, 2017

(65) Prior Publication Data
US 2017/0324661 A1    Nov. 9, 2017

Related U.S. Application Data

(63) Continuation of application No. 14/818,072, filed on Aug. 4, 2015, now Pat. No. 9,729,443, which is a
(Continued)

(51) Int. Cl.
*G06F 9/455* (2018.01)
*H04L 12/741* (2013.01)
(Continued)

(52) U.S. Cl.
CPC ........ *H04L 45/745* (2013.01); *G06F 9/45558* (2013.01); *G06F 9/542* (2013.01);
(Continued)

(58) Field of Classification Search
CPC combination set(s) only.
See application file for complete search history.

(56) References Cited

U.S. PATENT DOCUMENTS 5,515,513 A * 5/1996 Metzger .............. H04L 12/4625
                                                        370/401
5,530,703 A    6/1996 Liu et al.
(Continued)

OTHER PUBLICATIONS

Chen, Gary P. et al., "Optimizing I/O Virtualization: Preparing the Datacenter for Next-Generation Applications", Sep. 2009, IDC, Framingham, MA (10 pages).
(Continued)

*Primary Examiner* — Mohamed A Kamara
(74) *Attorney, Agent, or Firm* — James L. Baudino (57) ABSTRACT

Various systems, processes, and products may be used to filter multicast messages in virtual environments. In particular implementations, a system, process, and product for filtering multicast messages in virtual environments may include the ability to, responsive to receiving a multicast message including a destination address, examine a local filtering store of the network adapter for a multicast filtering address matching the destination address. The message is sent to respective virtual machines if the destination address matches the multicast filtering address found in the local filtering store for the respective virtual machines. Responsive to determining that the destination address does not match any multicast filtering address found in the local filtering store, a determination is made whether the local filtering store is full and, if so, the multicast message is dropped.

20 Claims, 5 Drawing Sheets

Related U.S. Application Data continuation of application No. 13/614,839, filed on Sep. 13, 2012, now Pat. No. 9,116,760, which is a continuation of application No. 13/364,442, filed on Feb. 2, 2012, now Pat. No. 9,135,092.

(51) Int. Cl.
*H04L 12/18* (2006.01)
*H04L 29/06* (2006.01)
*G06F 9/54* (2006.01)
*H04L 12/58* (2006.01)

(52) U.S. Cl.
CPC ........ *H04L 12/185* (2013.01); *H04L 63/0227* (2013.01); *G06F 2009/45595* (2013.01); *G06F 2209/543* (2013.01); *H04L 51/12* (2013.01)

(56) References Cited

U.S. PATENT DOCUMENTS

| | | | |
|---|---|---|---|
| 6,130,924 A | 10/2000 | Rosenzweig et al. | |
| 6,327,621 B1 | 12/2001 | Lee et al. | |
| 6,389,027 B1 | 5/2002 | Lee et al. | |
| 6,539,238 B1 | 3/2003 | Brouns et al. | |
| 6,839,348 B2 | 1/2005 | Tang et al. | |
| 7,171,495 B2 | 1/2007 | Matters et al. | |
| 7,586,936 B2 | 9/2009 | Arimilli et al. | |
| 7,590,116 B2 | 9/2009 | He et al. | |
| 7,660,306 B1 | 2/2010 | Eiriksson et al. | |
| 7,849,232 B2 | 12/2010 | Sharp et al. | |
| 7,913,294 B1* | 3/2011 | Maufer .................. | H04L 12/66 370/389 |
| 8,014,394 B2 | 9/2011 | Ram et al. | |
| 8,189,584 B2 | 5/2012 | Fernandez Gutierrez | |
| 9,729,443 B2* | 8/2017 | Cardona .................. | G06F 9/542 |
| 2003/0020948 A1 | 1/2003 | Jarvis et al. | |
| 2003/0031190 A1 | 2/2003 | Ohnishi | |
| 2006/0056446 A1 | 3/2006 | Lee et al. | |
| 2008/0086274 A1 | 4/2008 | Chamberlain et al. | |
| 2008/0165771 A1 | 7/2008 | Gainey et al. | |
| 2009/0304022 A1 | 12/2009 | Yang et al. | |
| 2011/0231406 A1 | 9/2011 | Ochs et al. | |
| 2012/0207158 A1 | 8/2012 | Srinivasan et al. | |
| 2013/0114599 A1 | 5/2013 | Arad et al. | |
| 2013/0204933 A1 | 8/2013 | Cardona et al. | |
| 2013/0205296 A1 | 8/2013 | Cardona et al. | |

OTHER PUBLICATIONS

Intel, "Acheiving Fast, Scalabe I/O for Virtualized Sewers," 2009, Intel Corporation (4 pages).

Wikipedia, "IP Multicast" (on-line), (retrieved from en.wikipedia.org/wiki/IP_multicast), (retrieved on Dec. 9, 2011) Wikipedia (9 pages).

VMware, Inc., "VMware Virtual Networking Concepts" (on-line), Jul. 18, 2007(retrieved on Sep. 29, 2011), (retrieved from www.vmware.com/files/pdf/virtual_networking_concepts.pdf), VMWare, Inc., Palo Alto, CA (12 pages).

Windows Development Center, "Mux 5.x-NDIS 5.x MUX Intermediate Driver Sample" (on-line), (retrieved from msdn.microsoft.com/en-us/library/windows/hardware/ff560575(d=printer),v=vs.85).aspx), (retrieved on Sep. 30, 2011), Microsoft Corp. (6 pages).

Wehrle, Klaus et al., "The Linux (R) Networking Architecture: Design and Implementation of Network Protocols in the Linux Kernel" (on-line), Aug. 1, 2004 (retrieved on Sep. 30, 2011), (retrieved from www.6testedu.cn/~lujx/linux_networking/toc_html), Prentice Hall (17 pages of 648 total).

IBM, "Method for Reducing CPU Utilization in Stack via Driver Multicast Address Filtering During Overflow," Apr. 27, 2009, (retrieved from www.ip.com/pubview/IPCOM000182346D), IBM (6 pages).

Mihalis, Zack, "PCI Express Gains I/O Virtualization" (on-line), Jul. 24, 2006, (retrieved on Feb. 1, 2011), Network World (retrieved from www.networkworld.com/news/tech/2006/072406-pci-express-virtualization.html) (2 pages).

\* cited by examiner

MULTICAST MESSAGE FILTERING IN VIRTUAL ENVIRONMENTS

BACKGROUND

The present invention relates to computer systems, and more particularly to messaging for computer systems.

Virtual machines techniques, which are available from a number of companies, including International Business Machines of Armonk, N.Y. and VMWare Inc. of Palo Alto, Calif., allow a portion of a relatively large computer system to be formed into a smaller computer system for a specific purpose as needed. For instance, a portion of a server system may be formed into a Web server. Moreover, the smaller computer system may be replicated as needed to provide more computing resources. For instance, a large number of Web servers could be quickly formed from a first Web server. Thus, virtual machines may be implemented quickly and are quite useful in dynamic environments.

A number of virtual machines may be serviced by a single network adapter. In the traditional network adapter driver model, multicast addresses are pushed down to the network adapter (e.g., for filtering purposes) until a threshold is met. This threshold is normally defined in the network adapter hardware specification, although newer adapters with a firmware-based intermediary can blindly accept addresses and provide feedback on the status of their acceptance by the hardware (e.g., add successful or add failed). In the end, however, the device driver is still required to manage a list of addresses.

In the context of managing multicast addresses for a number of virtual machines, a pre-determined allocation of resources is typically used for distributing the resources amongst the various virtual machines. For example, the resources may be divided evenly between the virtual machines. This solution allows for all of the virtual machines to benefit from the acceleration that the hardware provides

BRIEF SUMMARY

In one implementation, a process for filtering multicast messages in virtual environments may include determining whether a multicast message has been received at a network adapter where the message includes a destination address, and where the network adapter is configured to support multicast message filtering for a plurality of virtual machines. Responsive to receiving the multicast message, a local filtering store of the network adapter is examined for a multicast filtering address matching the destination address. The message is sent to respective virtual machines if the destination address matches the multicast filtering address found in the local filtering store for the respective virtual machines. Responsive to determining that the destination address does not match any multicast filtering address found in the local filtering store, a determination is made whether the local filtering store is full. Responsive to determining that the local filtering store is not full, the multicast message is dropped.

The details and features of various implementations will be conveyed by the following description, along with the drawings.

DETAILED DESCRIPTION

Multicast messages may be filtered in virtual environments by a variety of techniques. In particular implementations, for example, a network adapter may store multicast filtering data locally and on one or more virtual machines, which may be potential receivers of the multicast messages. When a multicast message is received, the network adapter may first examine its local store and, if there is no match, examine the stores on the virtual machines. Thus, multicast filtering may be provided at a hardware level, which is relatively fast, while still providing multicast filtering for a large number of virtual machines. Moreover, the filtering data may be dynamically assigned and reallocated by the network adapter.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 1:
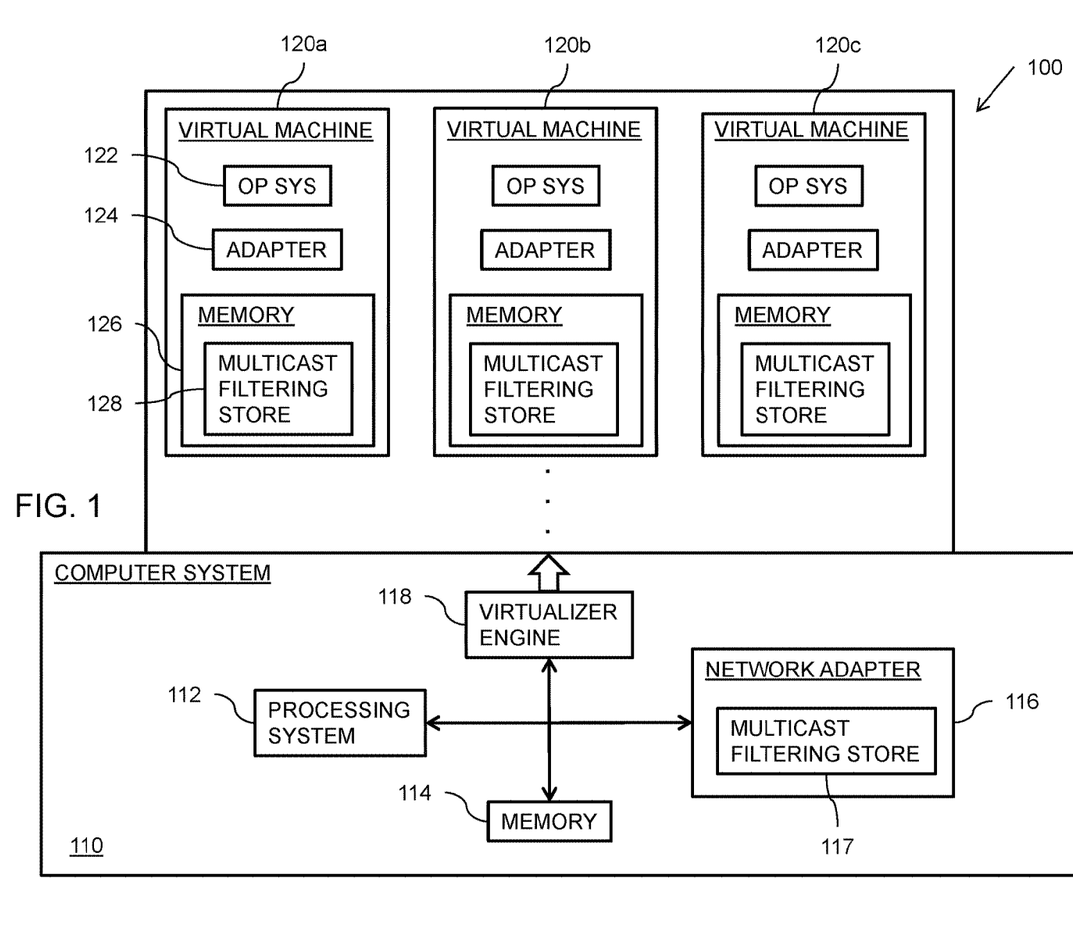
FIG. 1 is a block diagram illustrating an example system for filtering multicast messages in virtual environments.

FIG. 1 illustrates an example system 100 for filtering multicast messages in a virtual environment. System 100 includes a computer system 110 on which a number of virtual machines 120 are operating. Computer system 110 includes a processing system 112, memory 114, a network adapter 116, and a virtualizer engine 118. Computer system 110 may be composed of various hardware and software components, such as, for example, servers, processors, databases, and storage areas. Computer system 110 may, for instance, be a data center. Computer system 110 may appear as a single computer system to applications using and accessing it. Computer system 110 may, for instance, use virtualization to appear as an integrated computer system.

In particular implementations, computer system 110 may be a virtual input-output server (VIOS) from International Business Machines of Armonk, N.Y. A VIOS may provide an operating environment for virtual I/O administration. A VIOS may also facilitate the sharing of physical I/O resources between the virtual machines supported by computer system 110, such as virtual machines 120, by creating virtual devices. For example, a VIOS may provide virtual small computer system interface (SCSI) target and shared Ethernet adapter capability to client virtual machines within the data processing system, allowing the client virtual machines to share SCSI devices and Ethernet adapters.

Memory 114 may include, among other things, operating systems and applications for virtual machines 120. Memory 114 may also include a variety of other items for the virtual machines (e.g., queues, transmit engines, receive engines) as well as for the computer system (e.g., operating system and applications). Memory 114 may be composed of one or more storage devices (e.g., hard drives, tape drives, flash drives, etc.).

Network adapter 116 is a physical device that provides access to a communication network (e.g., a LAN, a WAN, or the Internet). Network adapter 116 acts as a single physical adapter and also creates virtual adapters, represented to virtual machines 120, which could, for example, be System p Logical Partitions (LPARs) from International Business Machines Corporation, as real physical adapters. Adapters able to perform this include those supporting the Single Root I/O Virtualization (SRIOV) extension to the PCI-E standard and the Multi-Root I/O Virtualization (MRIOV) extension. In general, any extension that allows I/O virtualization may be used.

SRIOV adapters utilize a dual function strategy when it comes to managing the device. There are virtual functions (VFs) that are the virtual adapter instances assigned to virtual machines. These are represented to a virtual machine just as any traditional adapter and are programmed/accessed via register access and direct memory access (DMA). There are also physical functions (PFs) that have control over a domain of VFs. Each PF acts as the parent PCI function for multiple VFs (the actual number is device specific). PFs can define operating parameters for the VFs in their domain and are also controlled via register access and DMA, at a VM level or via a hypervisor. For simplicity sake, any references in this disclosure to a controlling device driver refer to the PF. SRIOV is becoming increasingly relevant in the enterprise server ecosystem as it consolidates via virtualization.

Virtualized network adapters share physical resources amongst a finite but dynamic number of virtual functions. A common allocation approach is to evenly distribute physical resources amongst the supported VFs. Supported VFs can be all possible VFs supported by the hardware or all VFs that are assigned to the PFs and are currently in use, although changes in allocation may require an adapter reset. Another approach distributes resources based upon expected usage. For example, functions mapping to a 10 GbE link will likely need more resources than those mapped to a 1 GbE link, and magnitudes more than those mapped to 100 MbE link. While most resources easily fit into these methods of allocation, resources that require acute prioritization may be limited by static allocation.

Network adapter 116 also supports multicast filtering by using multicast filtering store 117. Multicast messages are used by network applications to send content from one machine (whether real or virtual) in a network to a group of machines (whether real or virtual) that are listening for a particular address. The destination addresses (e.g., multicast groups that the machines are listening on) for the multicast messages are requested by an application on a virtual machine and registered with a network interface, which may correspond with a single physical network port or multiple physical network ports. As a performance enhancement, network adapter 116 supports multicast filtering (e.g., by exact match or inexact via a hash algorithm) performed in the hardware, which could, for example be an application specific integrated circuit.

Virtualizer engine 118 is responsible for providing an interface between virtual machines 120 and computer system 110, which is responsible for actually executing the operations of the virtual machines 120 and transferring data to and from memory 114. Virtualizer engine 118 may export various virtualized hardware components such as virtual CPU(s), virtual memory, virtual disks, and virtual devices as constructs or emulations to the virtual machines. Thus, virtualizer engine 118 may make the resources of computer system 110 appear as a single computer system when it is in fact a number of computer systems. In particular implementations, virtualizer engine 118 may be a thin piece of software that runs on a host (e.g., along with the host operating system) or through an intervening kernel, which performs the functions of the host operating system.

In some implementations, virtualizer engine 118 may include a VIOS, a hypervisor, and a hardware management console. A hypervisor, also known as a virtual machine manager, is a program that enables multiple operating systems to share a single hardware host. Each operating system may appear to have the host's processor, memory, and other system resources all to itself. However, the hypervisor may actually control the host processor and the system resources, allocating the necessary resources to each operating system. The virtualizer engine, for example, may be built on Advanced Interactive eXecutive (AIX) from International Business Machines Corporation.

Each virtual machine 120 is a segmentation of computer system 110, virtualized as a separate computer system. In a VIOS environment, for example, each virtual machine 120 is a logical partition of computer system 110. Virtual machines 120 can be quickly deployed by allowing the image of the executable code that composes the solution for which the virtual machine partition is created to be shared amongst all similar virtual machines. Each virtual machine 120 may, however, behave as an independent computer system. Virtual machines 120 may, for example, be servers (e.g., Web, application, or database) or other appropriate types of computer systems.

Each of virtual machines 120 includes an operating system 122, which may be an image of an operating system in memory 114. Operating systems 122 may actually be different operating systems (e.g., Linux, Unix, and AIX) or different versions of the same operating system (e.g., 1.2, 1.4, and 2.1). Virtual machines 120 may run the same operating system (e.g., Linux), or they may run different operating systems. The applications for each virtual machine 120 may also be different.

Each virtual machine 120 also includes an adapter 124, which is a VF of network adapter 116, and a multicast filtering store 128, which may be created by computer system 110 at network adapter initialization. Through network adapter 116 and adapter 124, virtual machines 120 can receive multicast messages, which are often used in streaming. Virtual machines 120 may also receive unicast messages and broadcast messages.

For the multicast scenario, a message source sends messages that are received by machines that are listening for them (e.g., looking for a particular destination address). Virtual machines 120 may register the destination addresses for which they desire to receive messages with network adapter 116. In particular implementations, various applications on virtual machines 120 may register addresses with network adapter 116. These addresses, or representations thereof, may be placed in multicast filtering store 117, along with any other associated data (e.g., reference counts).

A reference count, for example, is a counter that is incremented each time an address is attempted to be added to the store (e.g., by an application on a virtual machine) and decremented each time the address is attempted to be removed from the store. Thus, the counter may be used to determine how many entities (e.g., virtual machines or applications) are interested in a multicast address while only having to store the multicast address one time.

The reference count could, for example, be implemented on a network adapter wide basis, in which case, the network adapter could have a metric regarding how many entities are currently interested in the multicast address (e.g., the difference between the number of times the reference count has been added and deleted). This could assist in determining which multicast addresses to store in multicast filtering stores 128. For instance, if a multicast address has a relatively high reference count, it may be a candidate for storage on network adapter 116, and a multicast address with a relatively low reference count may be a candidate for storage in one of multicast filtering stores 128. When the reference count reaches zero, the multicast address, along with its associated data, if any, could be removed from local store 116 or a multicast filtering store 128. The reference count could also be stored on a per virtual machine basis (e.g., the network adapter could understand that virtual machine A has added the multicast address three time, virtual machine B has added the same address two times, and virtual machine C has never added it), which could also be useful in determining how to allocate resources on the network adapter. For instance, in addition to determining which filtering data to store in the local store or in the multicast filtering stores, this counter type may assist in determining on which virtual machine 120 to store filtering data (e.g., on one that already is storing filtering data).

Multicast filtering stores 128 may be a region of memory on each virtual machine 120 that may be reached by network adapter 116 (e.g., by DMA techniques). Thus, virtual machines 120 may own the computer system memory 114 that will be mapped and used for the filtering stores. Hence, the virtual machines may allocate computer system memory 114 for the filtering stores. And the virtual machines may also map the memory to the network adapter (e.g., using operating system/virtualizer engine services) and inform the network adapter about the mapping (e.g., via by memory-mapped input/output (MMIO) operations or firmware-based operations). Typically, the network adapter is informed of the starting location of the region and its size. Multicast filtering stores 128 may store addresses or representations of addresses for filtering multicast messages, along with any other associated data.

In certain modes of operation, as multicast filtering addresses are pushed down to network adapter 116 from virtual machines 120 (e.g., by MMIO operations), the network adapter populates multicast filtering store 117. Multicast filtering store 117 may actually contain the pushed down addresses, representations of the addresses, or other data for filtering multicast messages. Representations of the addresses may, for example, be hash values of the addresses.

Network adapter 116 may use multicast filtering stores 128 of virtual machines 120 as additional storage for multicast filtering data. For example, if multicast filtering store 117 is full when network adapter 117 receives a multicast filtering address from virtual machine 120b, network adapter 117 may store the associated filtering data (e.g., the address itself) in the multicast filtering store 128 for virtual machine 120b.

In particular implementations, network adapter 116 may select which filtering data to put in multicast filtering stores 128 other than using a time-ordered basis. For example, network adapter 116 may examine the amount filtering data each virtual machine 120 has, the frequency of use of filtering data in filtering store 117, the number of virtual machines requesting a particular multicast address, and the time since a piece of filtering data was used. A virtual machine with a large amount of filtering data in filtering store 117 may, for instance, be selected for storing some of its associated filtering data in its filtering store 128. Additionally, filtering data that is used less frequently may be selected for storing in filtering stores 128. As another example, priorities may be associated with the filtering data and used to determine which filtering data to place in filtering stores 128. Furthermore, virtual machines 120 that are not using any multicast services may have no space allocated to them in multicast filtering store 117.

In some implementations, network adapter 116 may place multicast filtering data in filtering stores 128 before filtering store 117 is full. For example, network adapter may choose to place multicast filtering data in filtering stores 128 when new filtering data has a relatively low priority.

If the virtual machine 120 associated with the filtering data to be offloaded from networking adapter 116 does not have a region of memory set up for multicast filtering data, network adapter 116 may request the virtual machine to set up the area for the VF. A device driver for the virtual machine may, for instance, allocate, map, and assign a writeable and readable region of its memory 126 to each virtual adapter in use, for the purpose of managing multicast filtering data. In particular implementations, this area may be writeable and readable by network adapter 116 through DMA techniques, and thus, the region may be set up at initialization. The creation of the DMA queue may, however, be delayed until access to the region is needed. The size of multicast filtering stores 128 is implementation specific, with factors determined by the adapter hardware, the system architecture, and the retrieval strategy (e.g., direct address match versus hashed address match versus approximate address match), which will be discussed below.

When network adapter 116 receives an incoming multicast message (e.g., a packet), the adapter may filter the message against the data in multicast filtering store 117. The network adapter may, for example, determine that a message is a multicast message by inspecting the messages as it arrives. In particular implementations, for example, the lower bit of the first octet in the Media Access Control (MAC) address may be inspected to determine whether a message is a multicast message. If the message is a multicast message, network adapter 116 may filter the message against multicast filtering store 117. If a match is found, network adapter 116 may allow the message to pass through to virtual machines 120, which may be listening for the multicast message at their adapter 124. In particular implementations, the message may pass to the virtual machines that requested to listen for that multicast message type (e.g., based on destination address). This may, for example, be accomplished with virtual machine specific reference counts or via hash. In other implementations, the message may pass to all virtual machines 120.

If, however, a match is not found in filtering store 117, network adapter 116 may analyze multicast filtering stores 128, if any. For example, network adapter 116 may individually inspect each filtering store 128.

Network adapter 116 may, for instance, know which virtual machines have multicast features by inspecting addresses or tagging for the message. For instance, the network adapter may know which virtual LANs (VLANs) are configured over a particular network interface. Thus, the network adapter can map incoming traffic to virtual machines through VLAN identifiers when using VLAN. Additionally, the network adapter may know which virtual machines have requested multicast filtering, which may reduce the number of virtual machine stores to inspect.

In particular implementations, filtering stores 128 are not examined if filtering store 117 is not fully populated. If filtering store 117 is not fully populated, for example, no data may exist in filtering stores 128. The message may be dropped if no match is found in filtering store 117 and it is not fully populated.

If a match for the destination address, or a representation thereof, is found in one of filtering stores 128, network adapter 116 may allow the message to pass to virtual machines 120. If a match is not found in filtering stores 128, the message may be dropped, thus preventing unnecessary traffic from flowing to the rest of computer system 110.

To minimize memory transactions in certain implementations, multicast filtering data (e.g., addresses) could be stored in filter stores 128 in a manner that would facilitate the lookup process. This could, for example, include storing the data in a hashed format so that network adapter 116 can quickly determine if an address even exists in filtering stores 128. Under such a solution, incoming messages that failed to obtain a match in filtering store 117 could be hashed (e.g., according to destination address). The result would indicate an entry or area in the filtering stores 128. The message could then be checked against that entry. Due to the potentially expensive nature of memory transactions in such a scenario, a group of addresses (e.g., 32) could also be hashed to a single region so that upon retrieval, a larger region of memory can be read in a single memory transaction rather than having a memory transaction per address. In particular implementations, the hash of a message may indicate an area in one of filtering stores that may be regarded as a match.

Network adapter 116 may also be able to determine which filtering stores 128 to examine. For example, the filtering stores associated with a multicast message might be determined based on the destination address or a VLAN tag. Additionally, the network adapter may know which virtual machines have requested multicast filtering and/or how many addresses are associated with each, which may limit the number of filtering stores 128 to examine.

System 100 has a variety of features. For example, by allowing a network adapter to manage the multicast filtering data (e.g., by placing filtering data in a multicast filtering store as needed), an enhanced allocation of the finite resources of the network adapter may be achieved. Thus, virtual machines that might previously have been denied the benefits of hardware acceleration (e.g., those that experience the greater multicast traffic) due to a hard limitation may now be able to have more resources allocated to them when demand is high, which may prevent them from overflowing. Moreover, the allocation may be performed on a dynamic basis. Furthermore, because there are multiple strategies for determining priority (requested priority, most recently used, most frequently used, etc.), the network adapter may be configured (e.g., by a system administrator) to operate in a mode that best fits its environment.

Additionally, system 100 allows potentially expensive memory transactions to be reduced. For example, by using hashing a group of addresses to a single region, a larger region of memory can be read in a single DMA transaction rather than having a transaction per address.

Although FIG. 1 illustrates one system for performing multicast message filtering in virtual environments, other systems may include fewer, additional, and/or a different configuration of components. For example, in some systems, not all virtual machines may have a filtering store and/or an adapter. As another example, a computer system may have its own operating system, which may be different from the operating system(s) for the virtual machines.

Figure 2A:
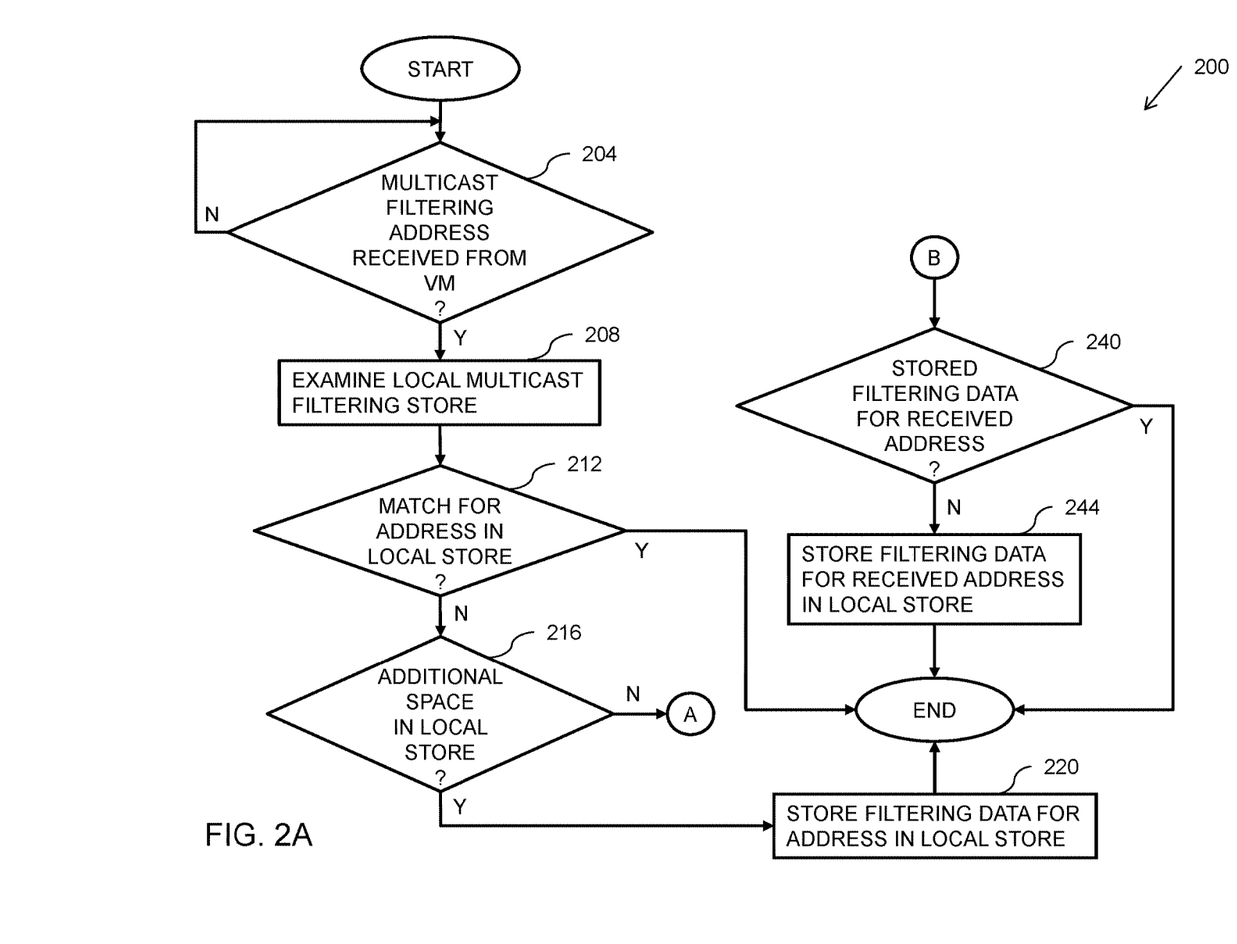
FIGS. 2A-B are a flowchart illustrating an example process for filtering multicast messages in virtual environments.
Figure 2B:
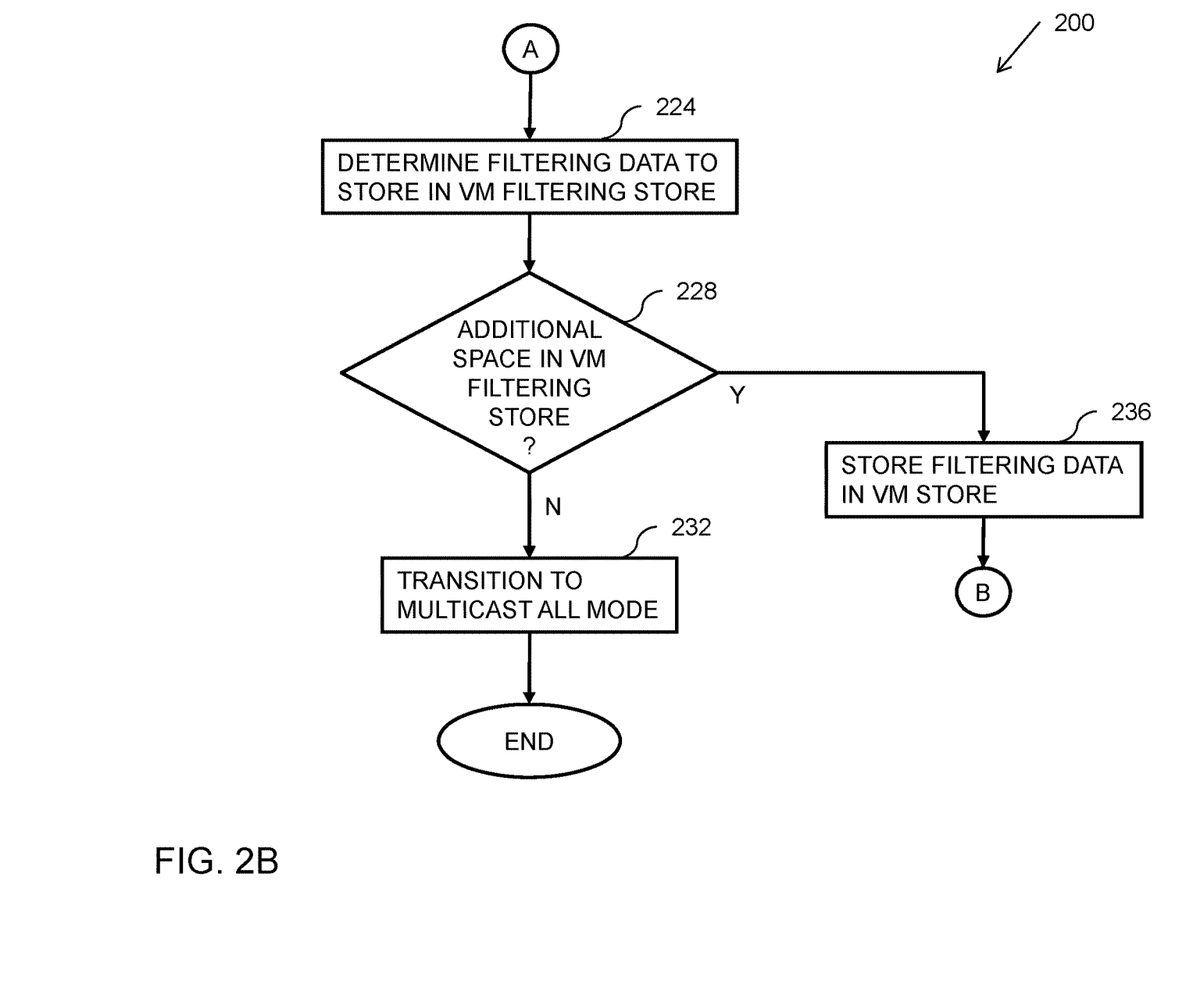

FIG. 2 illustrates an example process 200 for filtering multicast messages in virtual environments. Process 200 may, for example, be implemented by a network adapter like network adapter 116.

Process 200 calls for determining whether an address for multicast filtering has been received from a virtual machine (operation 204). The address may, for example, be for an approved destination address (e.g., multicast group) for multicast messages. If a multicast filtering address has not been received from a virtual machine, process 200 calls for waiting for a multicast filtering address.

Once a multicast filtering address has been received from a virtual machine, process 200 calls for examining a local multicast filtering store (operation 208). The local store may, for example, include addresses or representations of addresses (e.g., hashed addresses). Process 200 also calls for determining whether the received address has a match in the local store (operation 212). If the received address has a match in the local store, process 200 is at an end. There is no need to store the received address (or a representation thereof) as it is already stored locally.

If, however, the received address does not have a match in the local store, process 200 calls for determining whether there is additional space in the local store (operation 216). A network adapter may only be able to locally store a limited amount of data (e.g., one-hundred addresses). Thus, the local store may be overwhelmed when the network adapter is supporting a large number of virtual machines (e.g., hundreds).

If there is additional space in the local store, process 200 calls for storing filtering data for the received address (e.g., the address itself or a representation thereof) in the local store (operation 220). Process 200 is then at an end.

If, however, there is not additional space in the local store, process 200 calls for determining filtering data to store in a multicast filtering store of a virtual machine (operation 224). This may, for example, be accomplished by examining statistics on the filtering data in the local store and the virtual machines with which the filtering data are associated. For instance, if certain filtering data is used infrequently, it may be a likely candidate to move from the local store to a filtering store of a virtual machine. As another example, if a virtual machine has a relatively large amount of filtering data in the local store, it may be desirable to move some of this filtering data out of the local store and to the virtual machine because this may allow virtual machines with a smaller amount of filtering data in the local store to have their filtering data stored locally, not to mention isolating the number of locations that the network adapter has to look to find additional filtering data. As an additional example, multicast messages may have priorities associated with them, which may inform the determination.

Once filtering data has been selected for storage in a filtering store of a virtual machine, process 200 calls for determining whether there is additional space in the filtering store on the associated virtual machine (operation 228). In particular implementations, the storage area may be accessible or readable/writeable by the network adapter using DMA techniques. Thus, a network adapter may manage the shared memory area via DMA transactions. If additional space in the virtual machine's filtering store does not exist, process 200 calls for transitioning to a multicast all mode (operation 232), which may be for the particular virtual machine or all virtual machines. Process 200 is then at an end.

If additional space in the virtual machine's filtering store does exist, process 200 calls for storing the filtering data in the filtering store of the associated virtual machine (operation 236). This may, for example, be accomplished by transferring the filtering data to the virtual machine store using DMA techniques. Thus, while the virtual machine owns the memory for the filtering store, the network adapter manages the store, allowing the network adapter to store whatever data it desires there (e.g., address, hashed address, reference count, etc.).

Process 200 also calls for determining whether the filtering data stored in the virtual machine's filtering store is for the received address (operation 240). If the filtering data stored in the virtual machine's filtering store is for the received address, process 200 is at an end. If, however, the filtering data stored in the virtual machine's filtering store is not for the received address, process 200 calls for storing filtering data for the received address in the local filtering store (operation 244). Process 200 is then at an end.

Process 200 may be repeated multiple times during the operation of a system supporting virtual machines. In particular implementations, process 200 may be repeated continuously.

Although FIG. 2 illustrates a process for multicast message filtering in virtual environments, other processes for multicast message filtering in virtual environments may include fewer, additional, and/or a different arrangement of operations. For example, a process may place filtering data in the store of a virtual machine even if there is space in the local store. This may, for instance, occur if the available space in the local store is reserved for higher priority multicast messages. As another example, a process may not determine which filtering data to store in the filtering store of a virtual machine. For instance, the process may simply store the filtering data for the received address in the associated virtual machine. As a further example, a process may call for generating a mapping to virtual machines having multicast filtering stores to assist in analyzing those stores.

As an additional example, the addresses (or representations thereof) in the local filtering store may have associated data stored with them. For example, each address may have an associated reference counter such that the counter is incremented each time the address is attempted to be added to the store and decremented each time the address is attempted to be removed from the store. Thus, the counter may be used to determine how many virtual machines (or applications therein) are interested in a multicast address.

In certain implementations, a process could include moving filtering data from a virtual machine to the local store. This could, for example, occur as space becomes available in a network adapter's filtering store. A virtual machine may, for example, inform a network adapter that a multicast filtering address is no longer of interest, which could allow the network adapter to remove the associated filtering data from the local store (e.g., if the reference count went to zero). The network adapter may then select which data to move from a virtual machine to the local store (e.g., based on frequency of use). Moreover, data may be swapped between a virtual machine and the local store based on statistics regarding filtering data (e.g., frequency of use, time since last use, reference counts) and/or priority.

Figure 3:
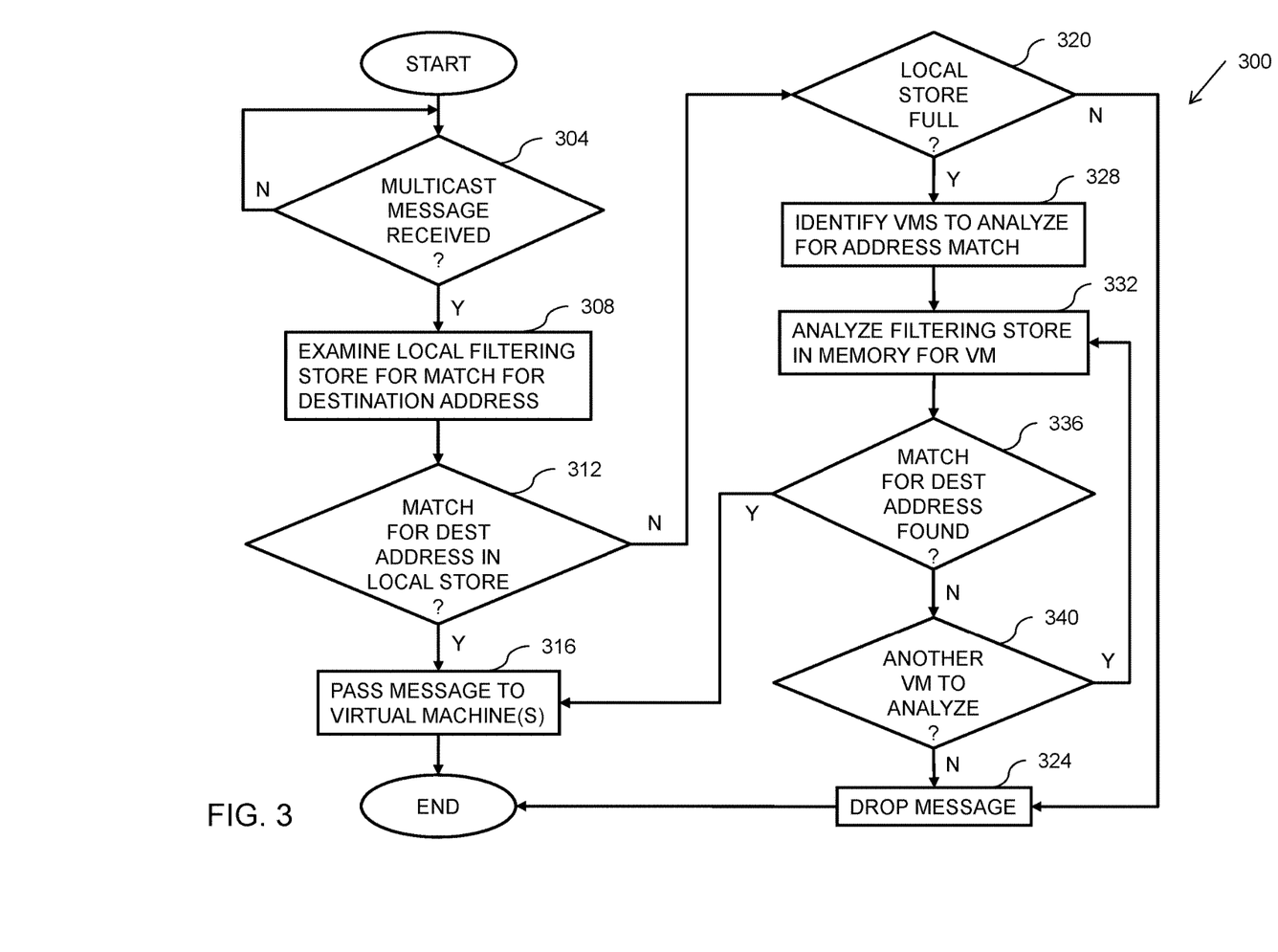
FIG. 3 is a flowchart illustrating another example process for filtering multicast messages in virtual environments.

FIG. 3 illustrates an example process 300 for multicast message filtering in virtual environments. Process 300 may, for example, be implemented by a network adapter like network adapter 116.

Process 300 calls for determining whether a multicast message has been received (operation 304). Determining whether a multicast message has been received may, for example, include examining a portion of a header for a message (e.g., an address). The multicast message may, for example, have been received from an external communication network or a virtual machine on the same host computer system. If the message is from a virtual machine using the same physical adapter, the message could be routed using the network adapter's internal virtual switch. If a multicast message has not been received, process 300 calls for waiting to receive a multicast message.

Once a multicast message has been received, process 300 calls for examining a local filtering store for a match for the destination address (operation 308). A match may, for example, be an exact match (e.g., address to address or hashed address to hashed address) or an approximate match (e.g., to a region of memory). Process 300 also calls for determining whether there is a match for the destination address in the local store (operation 312). If there is a match for the destination address in the local store, process 300 calls for passing the message to a number of virtual machines (operation 316). Process 300 is then at an end.

If, however, there is not a match for the destination address in the local store, process 300 calls for determining whether the local store is full (operation 320). If the local store is not full, process 300 calls for dropping the message (operation 324). Process 300 is then at an end.

If, however, the local store is full, process 300 calls for identifying a number of virtual machines to analyze for an address match (operation 328). The virtual machines to analyze may, for example, be determined by determining which virtual machines have filtering stores. Additionally, a hash function could be performed on the destination address and mapped to a table to determine the virtual machines to analyze.

Process 300 also calls for analyzing the filtering store of an identified virtual machine (operation 332). This may, for example, entail reading the contents of the filtering store by DMA techniques. Process 300 further calls for determining whether a match (e.g., exact or approximate) for the destination address was found (operation 336). If a match was found, process 300 calls for passing the message to a number of virtual machines (operation 316). Process 300 is then at an end.

If, however, a match was not found, process 300 calls for determining whether there is another virtual machine to analyze (operation 340). If there is another virtual machine to analyze, process 300 calls for analyzing the filtering store of the additional virtual machine (operation 332). Process 300 may cycle through operations 332-340 until a match for the destination address is found or the identified virtual machines have been examined.

If the identified virtual machines have been examined and no match for the destination address has been found, process 300 calls for dropping the message (operation 324). Process 300 is then at an end.

Process 300 may be repeated multiple times during the operation of a system supporting virtual machines. In particular implementations, process 300 may be repeated continuously.

Although FIG. 3 illustrates a process for filtering multicast messages in virtual environments, other processes for filtering multicast messages in virtual environments may include fewer, additional, and/or a different arrangement of operations. For example, a process may include analyzing the filtering store of a virtual machine even if the local store is not full. The local store may, for example, not be full while filtering data is in the virtual machines because the local store is reserved for filtering data for higher priority multicast messages. Additionally, any appropriate match may be used for a multicast message.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 4:
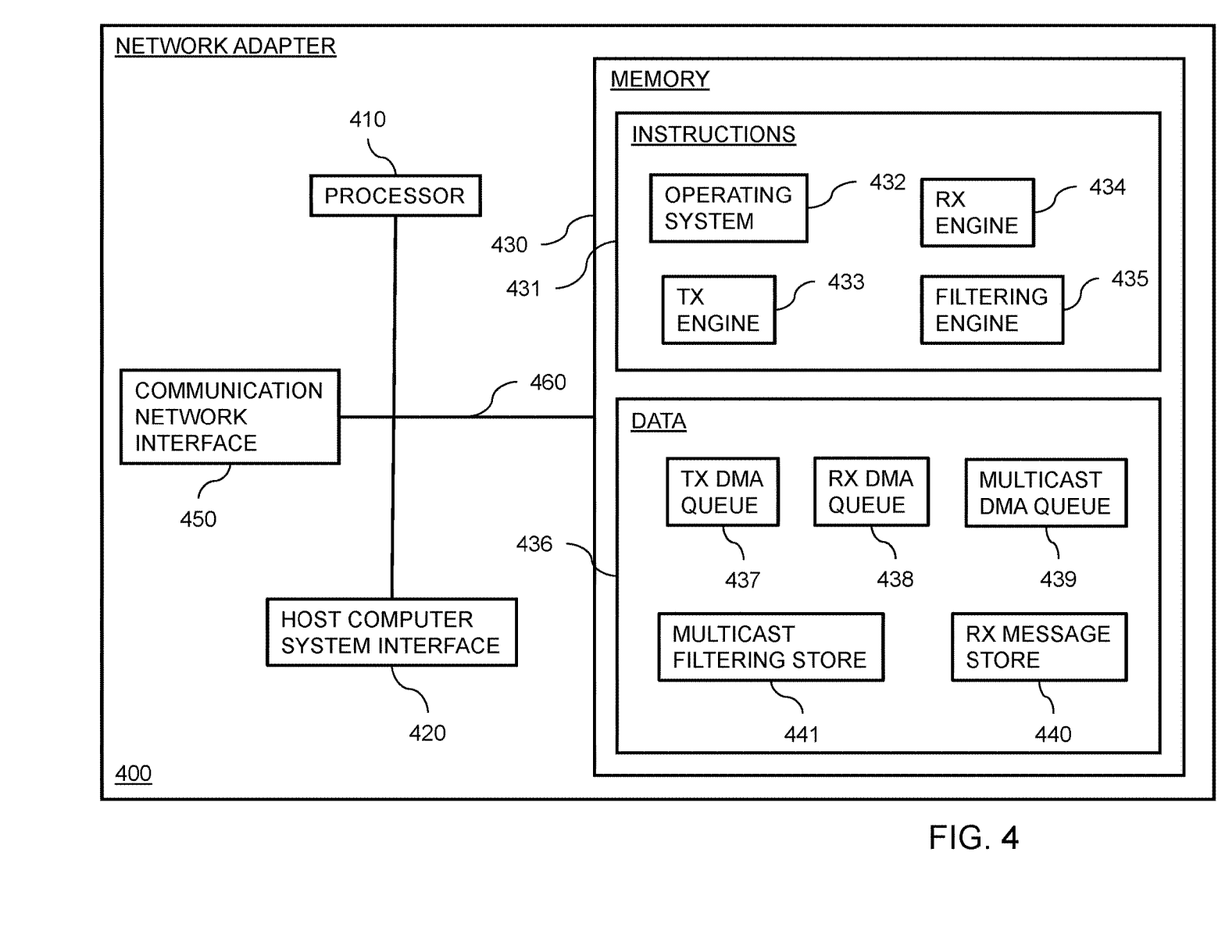
FIG. 4 is a block diagram illustrating a network adapter for filtering multicast messages in virtual environments.

FIG. 4 illustrates an example network adapter 400 for multicast message filtering in virtual environments. Network adapter 400 may, for example, be similar to network adapter 116 in system 100.

Network adapter 400 includes a processor 410, a host computer interface 420, memory 430, and a communication network interface 450, which are coupled together by a network 460. Network adapter 400 is only one example of a suitable network adapter, however, and is not intended to suggest any limitation as to the scope of use or functionality of other implementations described herein. Regardless, network adapter 400 is capable of being implemented and/or performing any of the functionality set forth hereinabove.

Processor 410 typically includes a logical processing unit (e.g., an arithmetic logic unit) that processes data under the direction of program instructions (e.g., from software or firmware). For example, processor 410 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Host computer interface 420 may, for example, be a bus interface for communicatively coupling with a host computer system. The bus interface may, for instance, be Peripheral Component Interconnect Express (PCI-E) interface. In general, host computer interface 420 may be any combination of devices by which a network adapter can receive data from and output data to a host computer system.

Memory 430 may, for example, include random access memory (RAM), read-only memory (ROM), flash memory, and/or disc memory. Various items may be stored in different portions of the memory at various times. Memory 430, in general, may be any combination of devices for storing data.

Memory 430 includes instructions 431 and data 436. Instructions 431 include an operating system 432 (e.g., Windows, Linux, or Unix), a transmit engine 433, a receive engine 434, and a filtering engine 435. In particular implementations, some or all of instructions 431 may be contained within the network adapter's chip (e.g., an Application Specific Integrated Circuit (ASIC)).

Data 436 includes the data required for and/or produced by instructions 431, including a transmit DMA queue 437, a receive DMA queue 438, a multicast DMA queue 439, a receive message store 440, and a multicast filtering store 441. Transmit DMA queue 437 and receive DMA queue 438 may correspond to a transmit DMA queue and a receive DMA queue on a virtual machine. Thus, an instance of each DMA queue may exist in host computer system memory and on network adapter 400.

Transmit engine 433 is responsible for reading messages from message buffers on a virtual machine (e.g., according to transmit DMA queue 437) and sending them into a communication network, which could be an external network or a virtual network supported by the network adapter. Receive engine 434 is responsible for receiving messages from the communication network, placing them into receive message store 440, selecting descriptors from receive DMA queue 438, and performing a DMA transfer of the messages into message buffers according to the selected descriptors.

Filtering engine 435 is responsible for filtering multicast messages upon arrival at network adapter 400 (e.g., from a communication network). As part of its operations, filtering engine 435 may use multicast filtering store 441, which may store filtering addresses or representations thereof.

Communication network interface 450 may, for example, be a physical transceiver for communicatively coupling the network adapter with a communication network. The interface may, for instance, conform to an Ethernet protocol. In general, communication network interface may be any combination of devices by which a network adapter can receive from and output data to a communication network.

Network 460 is responsible for communicating data between processor 410, host computer system interface 420, memory 430, and communication network interface 450. Network 460 may, for example, include a number of different types of busses (e.g., serial and parallel).

In certain modes of operation, as multicast filtering addresses are pushed down to network adapter 400 from virtual machines (e.g., by memory-mapped input/output (MMIO) operations), processor 410, according to filtering engine 435, may store filtering data (e.g., the address or a representation thereof) associated with the address in filtering store 441.

Network adapter 400 may also use multicast filtering stores of virtual machines as additional storage for multicast filtering data. For example, if multicast filtering store 441 is full when network adapter 400 receives a multicast filtering address from a virtual machine, network adapter 400 may store the associated filtering data in the multicast filtering store for the virtual machine.

In particular implementations, network adapter 400 may select which filtering data to put in a multicast filtering store of a virtual machine on other than a time-ordered basis. For example, network adapter 400 may examine the number of filtering addresses each virtual machine has, as well of the frequency of use of the filtering data in filtering store 441. Network adapter 400 may also place multicast filtering data in filtering stores of virtual machines before filtering store 441 is full. For example, network adapter 400 may choose to place multicast filtering data in filtering stores of virtual machines when new filtering data has a relatively high priority.

If the virtual machine associated with the filtering data to be offloaded from networking adapter 400 has a region of memory set up for a multicast filtering store and there is space available in the region, processor 410 may place the filtering data in the memory area of the virtual machine. This area may be accessible or readable/writable by network adapter 400 through DMA techniques.

When network adapter 400 receives an incoming multicast message, processor 410, according to receive engine 434, may place the message into receive message store 440. Processor 410 may then be informed that the message is a multicast message by hardware, which may, for example, examine the low bit of the first byte, and, according to filtering engine 435, filter the message against the data in multicast filtering store 441 (by exact match, hash, or both). If a match is found, processor 410 may pass the message through to a number of virtual machines, which may be listening for the multicast message.

If, however, a match is not found in filtering store 441, processor 410 may analyze multicast filtering stores in the virtual machines, if any. If a match is found in one of the filtering stores of the virtual machines, processor 410 may pass the message to the virtual machines. If a match is not found in the filtering stores of the virtual machines, the message may be dropped.

It should be understood that although not shown, other hardware and/or software components could be used in conjunction with network adapter 400. Examples, include, but are not limited to: microcode, device drivers, redundant processing units, external disk drive arrays, RAID systems, tape drives, and data archival storage systems, etc.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for multicast message filtering in virtual environments, and several others have been mentioned or suggested. Moreover, those skilled in the art will readily recognize that a variety of additions, deletions, modifications, and substitutions may be made to these implementations while still achieving multicast message filtering in virtual environments. Thus, the scope of the protected subject matter should be judged based on the following claims, which may capture one or more concepts of one or more implementations.

The invention claimed is:

1. A system comprising:
a computer system having hardware resources;
a virtualizer engine configured to virtualize the hardware resources to provide a plurality of virtual machines, a number of the virtual machines configured to receive multicast messages; and
a network adapter configured to:
responsive to receiving a multicast message including a destination address, examine a local filtering store of the network adapter for a multicast filtering address matching the destination address;
send the message to respective virtual machines if the destination address matches the multicast filtering address found in the local filtering store for the respective virtual machines;
responsive to determining that the destination address does not match any multicast filtering address found in the local filtering store, determine whether the local filtering store is full; and
responsive to determining that the local filtering store is not full, drop the multicast message.

2. The system of claim 1, wherein the network adapter is configured to, responsive to determining that the local filtering store is full, analyze filtering stores of the virtual machines for the multicast filtering address matching the destination address.

3. The system of claim 2, wherein the network adapter is configured to drop the message if a match for the destination address is not found in the filtering stores of the virtual machines.

4. The system of claim 1, wherein the network adapter is configured to receive from the virtual machines a registration of the destination address for the multicast filtering address.

5. The system of claim 2, wherein the network adapter is further configured to identify the virtual machines to analyze for a match for the destination address.

6. The system of claim 1, wherein the network adapter is further configured to maintain a reference count indicating a quantity of the virtual machines having registered a particular destination address with the network adapter.

7. The system of claim 1, wherein the network adapter is further configured to select whether to store the multicast filtering address in the local filtering store or the filtering store of the virtual machines.

8. A method comprising:
determining whether a multicast message has been received at a network adapter, the message including a destination address, the network adapter configured to support multicast message filtering for a plurality of virtual machines;
responsive to receiving the multicast message, examining a local filtering store of the network adapter for a multicast filtering address matching the destination address;
sending the message to respective virtual machines if the destination address matches the multicast filtering address found in the local filtering store for the respective virtual machines;
responsive to determining that the destination address does not match any multicast filtering address found in the local filtering store, determining whether the local filtering store is full; and
responsive to determining that the local filtering store is not full, dropping the multicast message.

9. The method of claim 8, further comprising, responsive to determining that the local filtering store is full, analyzing by the network adapter filtering stores of the virtual machines for the multicast filtering address matching the destination address.

10. The method of claim 9, further comprising dropping the message if a match for the destination address is not found in the filtering stores of the virtual machines.

11. The method of claim 8, further comprising receiving by the network adapter from the virtual machines a registration of the destination address for the multicast filtering address.

12. The method of claim 9, further comprising identifying by the network adapter the virtual machines to analyze for a match for the destination address.

13. The method of claim 8, further comprising maintaining a reference count indicating a quantity of the virtual machines having registered a particular destination address with the network adapter.

14. The method of claim 8, further comprising selecting, by the network adapter, whether to store the multicast filtering address in the local filtering store or the filtering store of the virtual machines.

15. A computer program product for multicast filtering in virtual environments, the computer program product comprising:
a non-transitory computer readable medium having computer readable program code embodied therewith, the computer readable program code configured to:
determine whether a multicast message has been received at a network adapter, the message including a destination address, the network adapter configured to support multicast message filtering for a plurality of virtual machines;
responsive to receiving the multicast message, examine a local filtering store of the network adapter for a multicast filtering address matching the destination address;
send the message to respective virtual machines if the destination address matches the multicast filtering address found in the local filtering store for the respective virtual machines;
responsive to determining that the destination address does not match any multicast filtering address found in the local filtering store, determine whether the local filtering store is full; and
responsive to determining that the local filtering store is not full, drop the multicast message.

16. The computer program product of claim 15, wherein the computer readable program code is configured to, responsive to determining that the local filtering store is full, analyze filtering stores of the virtual machines for the multicast filtering address matching the destination address.

17. The computer program product of claim 16, wherein the computer readable program code is configured to drop the message if a match for the destination address is not found in the filtering stores of the virtual machines.

18. The computer program product of claim 15, wherein the computer readable program code is configured to receive, by the network adapter from the virtual machines, a registration of the destination address for the multicast filtering address.

19. The computer program product of claim 15, wherein the computer readable program code is configured to maintain a reference count indicating a quantity of the virtual machines having registered a particular destination address with the network adapter.

20. The computer program product of claim 15, wherein the computer readable program code is configured to select whether to store the multicast filtering address in the local filtering store or the filtering store of the virtual machines.

* * * * *